(12) United States Patent
Rigo et al.

(10) Patent No.: US 11,642,707 B2
(45) Date of Patent: May 9, 2023

(54) METHOD OF UNCLOGGING DUCTS IN PARTS OBTAINED BY ADDITIVE MANUFACTURING

(71) Applicant: SAFRAN LANDING SYSTEMS, Velizy-Villacoublay (FR)

(72) Inventors: Olivier Rigo, Seraing (BE); Thomas Kairet, Seraing (BE); Denis Luttenbacher, Molsheim (FR); Stéphane Lambre, Velizy-Villacoublay (FR); Stefano Argentero, Molsheim (FR); Gérard Balducci, Velizy-Villacoublay (FR)

(73) Assignee: SAFRAN LANDING SYSTEMS, Vélizy-Villacoublay (FR)

(*) Notice: Subject to any disclaimer, the term of this patent is extended or adjusted under 35 U.S.C. 154(b) by 0 days.

(21) Appl. No.: 16/116,378

(22) Filed: Aug. 29, 2018

(65) Prior Publication Data
US 2019/0061259 A1    Feb. 28, 2019

(30) Foreign Application Priority Data
Aug. 31, 2017   (FR) ...................................... 1758068

(51) Int. Cl.
*B22F 10/68*     (2021.01)
*B29C 64/35*     (2017.01)
(Continued)

(52) U.S. Cl.
CPC ................ *B22F 10/68* (2021.01); *B08B 9/00* (2013.01); *B22F 3/24* (2013.01); *B22F 5/106* (2013.01);
(Continued)

(58) Field of Classification Search
CPC .......... B22F 3/24; B22F 3/1055; B22F 3/105; B22F 2003/247; B22F 2003/1059;
(Continued)

(56) References Cited

U.S. PATENT DOCUMENTS 3,001,534 A * 9/1961 Grant, Jr. ............... B08B 9/0936
                                                          134/167 R
3,643,280 A * 2/1972 Powers ................. B08B 9/0553
                                                          15/104.061
(Continued)

FOREIGN PATENT DOCUMENTS

EP        3053676 A1     10/2016
EP        3153256 A1     4/2017

OTHER PUBLICATIONS

"Coaxial, adj." OED Online, Oxford University Press, Mar. 2022, www.oed.com/view/Entry/35176. Accessed May 16, 2022. (Year: 2022).*

(Continued)

*Primary Examiner* — Mikhail Kornakov
*Assistant Examiner* — Richard Z. Zhang
(74) *Attorney, Agent, or Firm* — Christensen O'Connor Johnson Kindness PLLC

(57) ABSTRACT

A method of unclogging ducts in a part made by additive manufacturing, the ducts running from at least one well that opens out into the surface of the part, the method comprising the steps of: fabricating a guide with a body that is designed to fit in the well, the guide having internal channels that extend from a base of the guide that is accessible by a user to an outside wall of the body; cleaning the well and inserting the body of the guide in the well so that channels in the guide open out in register with inlets of ducts that are to be unclogged; and inserting a thin flexible tool, e.g. a metal cable, through the base of the guide into at least one (Continued)

channel therein and causing the tool to penetrate into the duct in register in the part so as to unclog it.

10 Claims, 3 Drawing Sheets

(51) Int. Cl.
| | | |
|---|---|---|
| *B22F 3/24* | (2006.01) | |
| *B22F 5/10* | (2006.01) | |
| *B08B 9/00* | (2006.01) | |
| *B33Y 10/00* | (2015.01) | |
| *B08B 1/00* | (2006.01) | |
| *B08B 9/043* | (2006.01) | |

(52) U.S. Cl.
CPC .............. *B29C 64/35* (2017.08); *B08B 1/005* (2013.01); *B08B 9/0436* (2013.01); *B22F 2003/247* (2013.01); *B33Y 10/00* (2014.12)

(58) Field of Classification Search
CPC .......... B22F 2003/245; B22F 2003/241; B22F 5/106; B22F 5/10; B22F 5/04; B22F 2005/001; B22F 2005/002; B22F 2202/01; B22F 2998/00; B22F 2998/10; B22F 2999/00; B22F 2005/003; B22F 1/00–12/90; B22F 10/68; B29C 64/35; B29C 64/165; B29C 64/153; B29C 59/00; B29C 64/00–40; B33Y 10/00; B33Y 30/00; B33Y 80/00; B33Y 40/00–02; B08B 1/005; B08B 1/008; B08B 7/02; B08B 9/00; B08B 9/0436; B08B 9/02; B08B 9/027; B08B 9/0808; B08B 9/087; B08B 9/04–057; B08B 1/00–04; B23B 45/00; B23B 45/06; B25B 15/06; B26D 1/547; B26D 1/553; E03F 9/002; E03F 9/005; E03C 1/302; B64F 5/30; B23P 2700/06; F02B 77/04; F01D 25/002

USPC ........... 4/255.01; 15/104.33, 104.05, 104.07, 15/104.09

See application file for complete search history.

(56) References Cited

U.S. PATENT DOCUMENTS

| | | | | |
|---|---|---|---|---|
| 4,069,535 | A * | 1/1978 | Cato | ..................... B08B 9/0553 15/104.061 |
| 5,457,841 | A * | 10/1995 | Minton | ................. B08B 9/0557 15/104.061 |
| 5,765,251 | A * | 6/1998 | Jones | .................... B08B 9/0436 15/104.32 |
| 2005/0204489 | A1* | 9/2005 | Velez | ........................ B08B 1/04 15/21.1 |
| 2011/0106019 | A1* | 5/2011 | Bagwell | ................ B08B 9/0436 604/267 |
| 2012/0107496 | A1 | 5/2012 | Thoma | |
| 2013/0199040 | A1* | 8/2013 | Dudeck | .............. G02B 23/2492 29/889.1 |
| 2017/0144382 | A1 | 5/2017 | Ott et al. | |

OTHER PUBLICATIONS

Rapport de Recherche Préliminaire dated May 16, 2018, issued in corresponding French Application No. 1758068, filed Aug. 31, 2017, 2 pages.

\* cited by examiner

METHOD OF UNCLOGGING DUCTS IN PARTS OBTAINED BY ADDITIVE MANUFACTURING

FIELD OF THE DISCLOSURE

Embodiments of the disclosure relate to methods for unclogging ducts in parts obtained by additive manufacturing.

BACKGROUND

In aviation, interest has recently been directed to making hydraulic blocks out of titanium using additive manufacturing technology, and in particular electron beam melting.

Particles of titanium alloy (typically TA6A14V) in powder form are inserted in successive layers into an evacuated enclosure. The enclosure is heated, typically up to a temperature of about 700 degrees Celsius. The inserted layer is initially pre-heated so as to become solid in the form of an amalgam of sintered particles. Then an electron gun is controlled to bombard the portion of the amalgam layer that is to form the part being manufactured in order to cause that portion to melt. A solid alloy part is thus obtained having mechanical characteristics lying between those of a casting and those of a forging, but in which all the empty spaces, and in particular ducts and other orifices, are filled with the amalgam of metal particles that are weakly bonded together. After the part has cooled, it is therefore necessary to eliminate the amalgam completely.

This cleaning operation is generally performed in a closed enclosure in order to recover the particles, and it is performed by way of example with a compressed air nozzle. Nevertheless, experience shows that ducts of small diameter (typical a few millimeters) as are usually to be found in hydraulic blocks are impossible to clean using a nozzle.

Proposals are made in Document EP 3 153 256 for fabricating a cord of solidified metal inside each of the ducts at the same time as fabricating the remainder of the part. When cleaning the part, the cord is initially extracted from each of the ducts, thereby taking with it a considerable portion of the amalgamated particles present in the duct. The duct is then unclogged and cleaning can be finished off with the nozzle.

Nevertheless, that method is not suitable for all ducts. Some ducts are tortuous in shape, which means that the cord cannot be extracted. In addition, the cord breaking while it is being extracted is catastrophic since it is then no longer possible to extract the portion of the cord that is still present in the duct. Finally, the cord as made in that way presents material that has been melted and is therefore not recoverable, thereby increasing the time and the cost of manufacturing the part.

In the particular circumstance of hydraulic blocks, some of the small-diameter ducts do not run from the surface of the part, but from the insides of open wells of large diameter that are to receive valve slides. They are particularly difficult to access.

SUMMARY

Embodiments of the disclosure seek to propose methods for unclogging ducts in parts made by additive manufacturing and that run from open wells.

In order to achieve this object or others, there is provided a method of unclogging ducts in a part made by additive manufacturing, the ducts running from at least one well that opens out into the surface of the part, the method comprising the steps of:

fabricating a guide with a body that is designed to fit in the well, the guide having internal channels that extend from a base of the guide that is accessible by a user to an outside wall of the body;

cleaning the well and inserting the body of the guide in the well so that channels in the guide open out in register with inlets of ducts that are to be unclogged in the part; and inserting a thin flexible tool, e.g. a metal cable, through the base of the guide into at least one channel therein and causing the tool to penetrate into the duct in register in the part so as to unclog it.

The inventors have experimented with various cleaning methods. It has been found that a simple flexile metal cable carried by the chuck of a percussion tool and inserted into a duct suffices to open up a through passage in the duct so that the nozzle can be used effectively in order to clean the duct completely. The use of a guide of the disclosure enables the cable to be caused to penetrate reliably into the duct from within the well.

The guide may be fabricated by additive manufacturing, and in some embodiments, out of the same material as the block in order to avoid introducing any pollution during the operation, and naturally, it can be reused with other parts.

The cleaning operation in some embodiments is performed within a closed enclosure so as to be able to recover the powder.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

Figure 1:
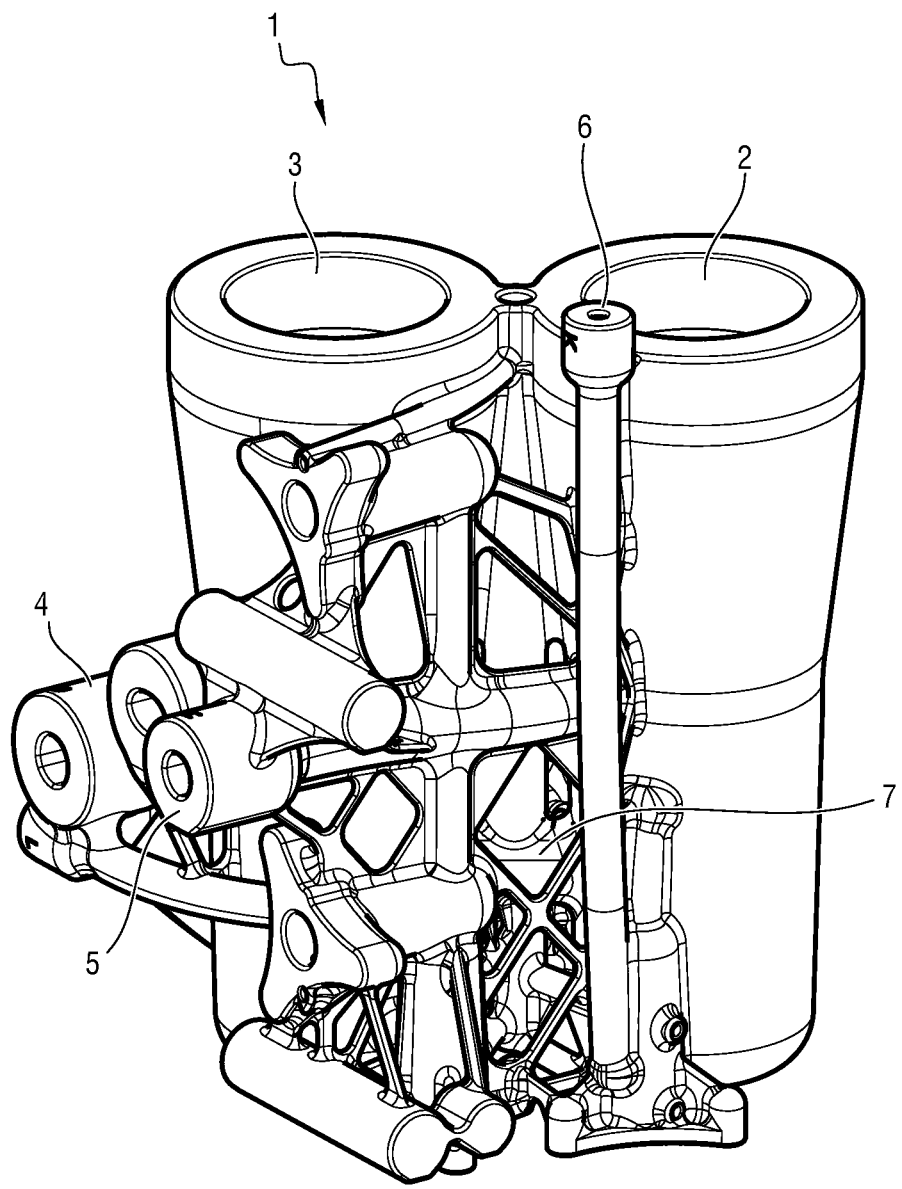
FIG. 1 is a perspective view of a representative example of a titanium alloy part obtained by additive manufacturing and having two wells from which there run a series of ducts that are to be unclogged.

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed FIG. 1 shows a titanium alloy part 1 obtained by additive manufacturing using the electron beam melting method. The part 1 is a hydraulic block that has two wells 2 and 3 (typically each having a diameter of a few centimeters) that are to receive valve slides, and also a plurality of narrow ducts (typically having a diameter of a few millimeters), some of which, like the ducts 4, 5, and 6, open to the outside via ports, and others, like the duct 7, extend between the wells 2 and 3.

FIG. 1 shows the part 1 when fully cleaned, however it should be understood that the part leaves the additive manufacturing machine surrounded by and filled with an amalgam of metal particles that are weakly bonded together and that needs to be eliminated. The outside of the part 1 and indeed the insides of the wells 2 and 3 are easy to clean, e.g. using a compressed air nozzle. In embodiments of the disclosure, the insides of the ducts 4, 5, and 6 leading to the outside can be cleaned using a cable that is pushed progressively into the ducts from their open outside ends. By way of example, the cable may be held by the chuck of a percussion or "hammer" drill or any other portable motor-driven tool so that the cable rotates and strikes against the amalgam of powder inside the ducts, progressively unclogging a passage in each duct and ending up with a duct that is unclogged from end to end. Cleaning of the ducts can then be finished off using the compressed air nozzle in order to remove all of the amalgam particles.

Figure 2:
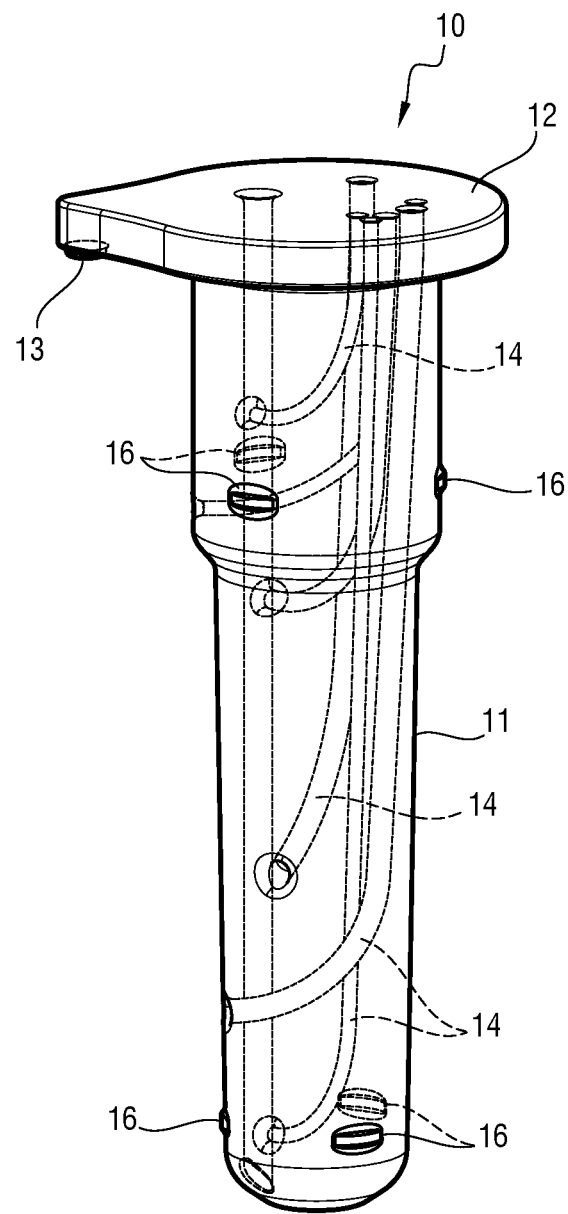
FIG. 2 is a perspective view of a representative example of a guide of the disclosure that corresponds to the part of FIG. 1, the guide being shown transparently so that its internal channels can be seen.

Embodiments of the disclosure also relate to unclogging ducts such as the duct 7 (also visible in FIG. 3) that are difficult to access for a cleaning cable. In the disclosure, provision is made to use a guide 10 as shown in FIG. 2, which guide comprises a body 11 for inserting in one of the wells 2, 3 together with a base 12 that remains outside the wells 2, 3 and has a finger 13 that is to be received in an appropriate cavity formed in the part 1 in order to index the guide 10 within the well. The guide 10, which is made of plastics material by additive manufacturing in this example, has channels 14 that open out firstly into the base 12 and secondly into the outside wall of the body 11 so as to be in register with respective internal ducts in the part 1.

Figure 3:
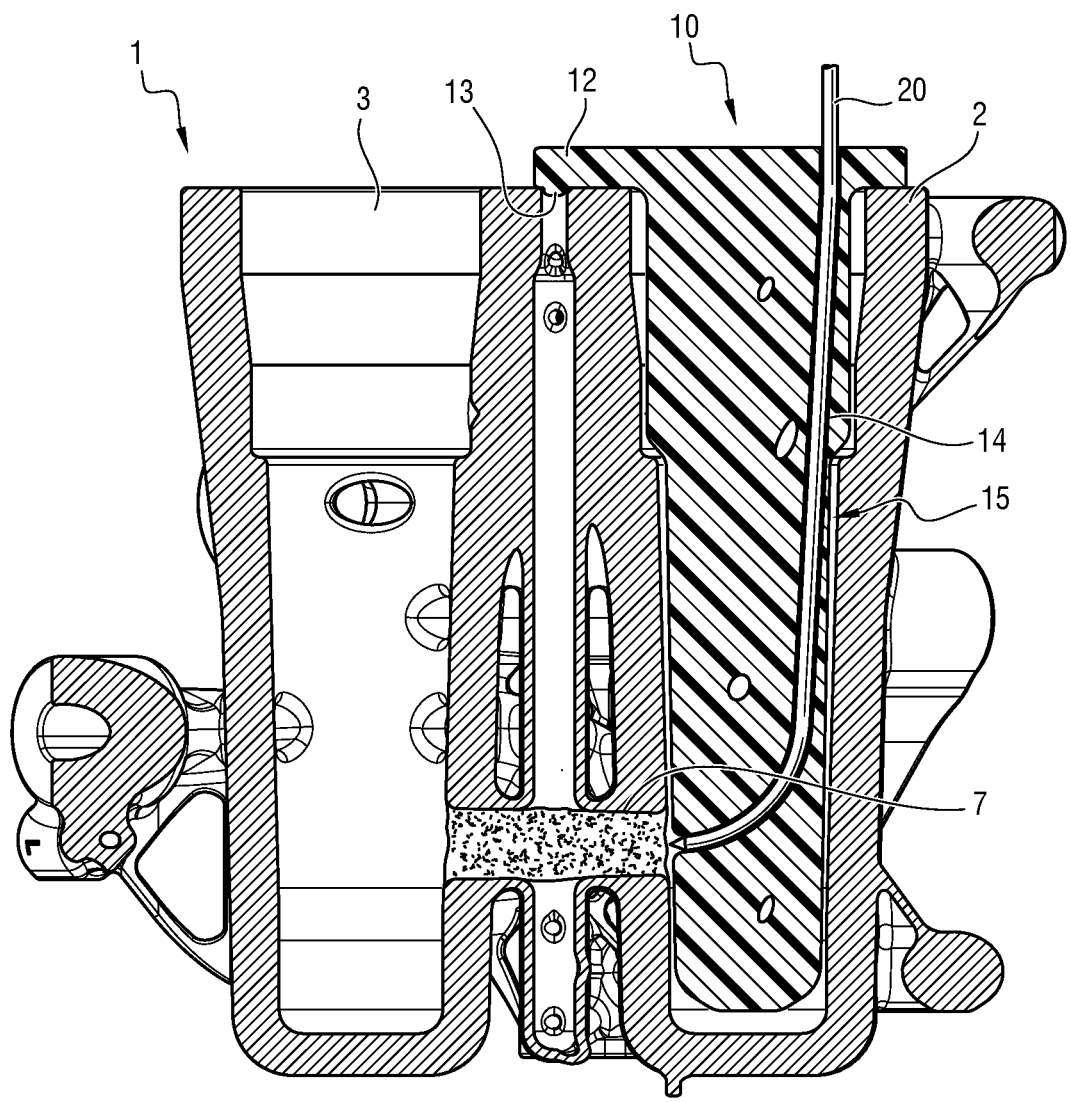
FIG. 3 is a section view of the part with the guide in position therein, showing one of the guide channels opening out in register with the inlet to one of the ducts in the part.

In FIG. 3, the guide 10 is shown in place in the well 2. It can be seen that inserting a cable 20 into one of the channels 14 serves to guide the cable to the inlet of the internal duct 7 in the part 1 that is full of amalgamated particles. The cable 20 can then be inserted into the duct in order to unclog it progressively while being driven in rotation and with hammering by a percussion drill or any other similar portable tool. Once the duct has been unclogged, the cable 20 is withdrawn and it is engaged in another one of the channels 14 in the guide 10 in order to unclog another internal duct in the part 1. When all of the ducts have been unclogged, the guide 10 is withdrawn and cleaning of the ducts is finished off by using the nozzle in order to remove all of the amalgamated powder.

In some embodiments, the body 11 has a diameter that is slightly smaller than the diameter of the well in which it is inserted so as to leave a space 15 between the guide 10 and the wall of the well 2, which space serves to receive the metal powder detached by the cable while it is being inserted into the ducts in the part 1. In order to center the guide 10 in the well 2, the body 11 in some embodiments has studs 16 that co-operate with the wall of the well 2 in order to ensure that the guide 10 is inserted as a good fit with proper positioning in the well 2.

It is possible to make two distinct guides 10 for respective ones of the wells 2 and 3 in the part. Alternatively, if the wells are both identical in diameter and depth, it is possible to fabricate a single guide having all of the channels needed for reaching all of the ducts that open out into one or the other of the wells.

Embodiments of the disclosure are not limited to the above description but, on the contrary, covers any variant coming within the ambit defined by the claims.

In particular, although in the example shown a metal cable is used as an unclogging tool, it is possible more generally to use any thin and flexible tool suitable for penetrating into the ducts in order to dig out a channel therein through the amalgamated powder. It is possible to impart to the tool any kind of movement (rotary, percussion, vibration, . . . ) that is suitable for facilitating digging out of the duct.

Therefore, while the principles, representative embodiments, and modes of operation of the present disclosure have been described in the foregoing description, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A method of unclogging at least two ducts in a part made by additive manufacturing, the at least two ducts running from at least one well that opens out into a surface of the part, the method comprising the steps of:
    fabricating a guide with a body that is designed to fit in the at least one well, the guide including a stop remaining outside the at least one well for the introduction of the body on the at least one well and having at least two internal channels that extend from a base of the guide that is accessible by a user to an outside wall of the body;
    cleaning the at least one well and inserting the body of the guide in the at least one well so that an outlet of each of the at least two internal channels in the guide opens out in register with an inlet of each of the at least two ducts that is to be unclogged; and
    inserting a thin flexible tool through the base of the guide into each of the at least two internal channels therein and causing the flexible tool to penetrate into each of the at least two ducts so as to unclog said at least two ducts.

2. The method according to claim 1, wherein at least percussive motion is imparted to the flexible tool.

3. The method according to claim 1, wherein the guide is used for unclogging the at least two ducts running from two distinct wells, the guide having the at least two channels for the flexible tool to penetrate into each of the at least two ducts whose inlet opens out into one of the two wells.

4. The method according to claim 1, wherein the guide is made out of plastics material by using an additive manufacturing method.

5. The method according to claim 1, wherein the base of the guide has an indexing finger for indexing the position of the guide in the part.

6. The method accordingly to claim 1, wherein the flexible tool includes a metal cable.

7. A method of unclogging at least two ducts in a part made by additive manufacturing, the at least two ducts running from at least one well that opens out into a surface of the part, the method comprising:
    fabricating a guide with a body that is designed to fit in the at least one well, the guide including a stop remaining outside the at least one well for the introduction of the body on the at least one well and having at least two internal channels that extend from a base of the guide that is accessible by a user to an outside wall of the body;

cleaning the at least one well and inserting the body of the guide in the at least one well so that an outlet of each of the at least two internal channels in the guide opens out in register with an inlet of each of the at least two ducts that is to be unclogged; and inserting a metal cable through the base of the guide into each of the at least two internal channels therein and causing the metal cable to penetrate into each of the at least two ducts so as to unclog said at least two ducts.

8. The method according to claim 1, wherein at least rotary motion is imparted to the flexible tool.

9. The method according to claim 1, wherein at least vibratory motion is imparted to the flexible tool.

10. The method according to claim 1, wherein the guide is made out of resin by using an additive manufacturing method.

\* \* \* \* \*